US006938273B2

(12) United States Patent
Ko (10) Patent No.: US 6,938,273 B2
(45) Date of Patent: Sep. 6, 2005

(54) CAP WITH ADJUSTABLE SUNGLASSES

(76) Inventor: Myung-Gun Ko, 80-4 703HO, Yuk-Kog 2Dong, Wonmi-ku, Buchoun, Kyung-Ki (KR)

( * ) Notice: Subject to any disclaimer, the term of this patent is extended or adjusted under 35 U.S.C. 154(b) by 0 days.

(21) Appl. No.: 10/744,710

(22) Filed: Dec. 23, 2003

(65) Prior Publication Data

US 2005/0132460 A1    Jun. 23, 2005

(51) Int. Cl.[7] ............................................. A61F 9/00
(52) U.S. Cl. ............................................ 2/10; 2/209.13
(58) Field of Search ............................. 2/422, 10, 453, 2/452, 209.13; 351/155

(56) References Cited

U.S. PATENT DOCUMENTS

| | | | | |
|---|---|---|---|---|
| 2,004,701 A | * | 6/1935 | Livengood | 2/10 |
| 2,538,607 A | * | 1/1951 | Vaca | 2/10 |
| 2,725,560 A | * | 12/1955 | Feldman | 2/10 |
| 4,951,316 A | * | 8/1990 | Moody | 2/10 |
| 5,533,207 A | * | 7/1996 | Diaz | 2/10 |
| 5,689,827 A | * | 11/1997 | Ryder | 2/10 |
| 5,987,640 A | * | 11/1999 | Ryder | 2/10 |
| 6,662,371 B2 | * | 12/2003 | Shin | 2/10 |

* cited by examiner

Primary Examiner—Rodney M. Lindsey
(74) Attorney, Agent, or Firm—Levine & Mandelbaum (57) ABSTRACT

A cap with sunglasses has an elongated holder mounted on the underside of the visor. A carrier partially surrounds the holder and is slidable therealong for adjusting the position of sunglasses mounted on the carrier. A latching assembly is captured in the carrier and has projections in the form of tines for being selectively inserted between teeth disposed along the length of the holder. A spring normally urges the latching means to insert the tines between the holder teeth. Movement of the carrier relative to the holder is permitted when the latching assembly is pressed against the restoring spring force to disengage the projections on the latching assembly from between the holder teeth to permit adjustment of the position of the sunglasses.

10 Claims, 8 Drawing Sheets

CAP WITH ADJUSTABLE SUNGLASSES

BACKGROUND OF THE INVENTION

The present invention is directed to caps with adjustable sunglasses, in particular, to caps having adjustable sunglasses that can be moved freely forward and backward relative to the cap visor in order to fit them suitably to the wearer's eyes or nose position while the sunglasses are attached to the cap visor.

In general, caps with various types of visors are worn to prevent direct exposure of the face to strong sun at beaches, or during hiking, fishing or athletic activities. Although such caps block some of sun's direct rays, they often cannot block glare caused by refraction or reflection of light. Therefore, people must suffer the inconvenience of having to carry sunglasses separate from visored caps for outdoor activities.

Products have been developed to alleviate such inconvenience and to provide caps with attached sunglasses. Diverse inventions have been made for this purpose including U.S. Pat. No. 1,473,013, E.U. Patent No. 0412737, E.U. Patent No. 0321617, French Patent FR-F-66, German Federal Patent DE2030546, Korean Utility Patent Notice No. 95-219 and Korean Utility Patent Public Notice No. 93-22785.

A typical approach is illustrated by the invention of Korean Utility Patent Public Notice No. 93-22785 which discloses a cap design where sunglasses are fixed to the bottom surface of a cap visor and rotatable to fold so that the sunglasses can be opened for normal use or stowed by being folded against the bottom surface of the visor.

These caps come with sunglasses having fixed positions so that the wearer cannot adjust the distance of the glasses from the wearer's eye position. Therefore, in the case of a wearer who wears eye glasses, the use of sunglasses on such a cap presents an inconvenience and blocks normal vision.

The invention of Korean Utility Patent Registration No. 20-0199241, Patent Application No. 20-2000-0013573, includes a guide rail which is attached to the middle section of a visor's bottom surface, towards the front and forms a guide path lengthwise internally while the opening of the guide path is equipped with a pair of holding ledges. A movable adjustment piece moves along the guide path of the guide rail to adjust for distance from the eyes. The sunglasses are attached to the lower end of the movable carrier and are rotatable for being folded against the cap visor.

This cap with sunglasses that are distance adjustable has the advantage of adjustment of the sunglasses' position to fit the wearer's needs by moving the sunglasses forward or rearwards with respect to the cap visor along a guide rail. However, this prior art detachable sunglass cap has a structure wherein the guide rail must be attached and detached to and from the bottom surface of the cap visor each time sunglasses need to be attached to the visor, thus requiring the repetitive and inconvenient task of adjusting the guide rail position to ensure that it is positioned in the direct center of the cap visor.

Furthermore, this prior art cap with detachable glasses has a structure where an end piece must be attached to an end of the guide rail so that the end piece and the movable adjustment piece have the possibility of detaching from the guide rail and getting lost. Also, in this design, an indented area is formed at a side of the holding ledge, whereby the sunglasses may be moved in accordance with each stage of indentation. However no holding piece is provided to fix the sunglasses' position so that even a slight impact can dislocate the sunglasses, changing their position either forward or backward along the guide rail.

SUMMARY OF THE INVENTION

Considering the above problems of existing designs, the object of the present invention is to provide caps with adjustable sunglasses which allow convenient adjustment of sunglass position with respect to the wearer's eyes and nose while, at the same time, allowing the selected sunglass position to be held firm.

In order to achieve the stated design objective the present invention has a holder which is fixed in the center of the bottom surface of the cap visor in the front to back direction so that a guide path is formed along the central axis of the holder; rails are formed along both sides of the guide path lengthwise, and upper holding teeth are arrayed in equal intervals between the guide path and rails. A carrier includes a trolley having a rectangular notch formed at the center area of one side of its base. On the bottom surface of the trolley base, inwardly of the rectangular notch, there is formed a lower ledge having lower guide grooves on either of its sides. An upper ledge is formed inwardly from the notch on the top surface of the trolley base and upper guide grooves are formed on both sides of the upper ledge. Guide flanges are formed on top of the trolley base for circumscribing and being guided along the rails of the holder. A hanger has a wall extending downwardly from the trolley base and terminates in an elbow. A latching assembly having a base and two parallel barbed tongues is guided along the upper and lower guide grooves in the carrier to form an integral body. The latching assembly can be attached and detached at the rectangular notch of the trolley base. Resiliently flexible spring arms extend from opposite sides of the base of the latching assembly. A plurality of tines on the outer surface of the upper tongue of the latching assembly are situated at a side of the guide path and rails of the holder 20 when pressure is applied to the area of the base between the spring arms, and the tines are situated between adjacent upper holding teeth of the holder when pressure is released from the spring arms.

A mounting unit has of a projection to allow sunglasses to be attached and detached via a slot in the lenses of the sunglasses. A connector on the mounting unit allows the mounting unit to be attached to and detached from to the elbow of the carrier.

Therefore, by moving the carrier to an appropriate location while pressing the latching assembly, and then releasing the pressure, the position of the sunglasses attached to the visor can be easily adjusted. Furthermore, when the upper holding teeth of the holder and the tines of the latching assembly are interlocked, the locked condition is maintained in a firm manner. These features facilitate simple and rapid adjustment of the sunglasses' position and prevent any unwanted movement of the sunglasses along the rails of the holder once the sunglasses' position has been fixed, even when a moderate external force is applied, so that an optimum wearing condition can be maintained at all times.

DESCRIPTION OF THE PREFERRED EMBODIMENT

Referring now to the drawings, a cap 11 has an elongated holder 20 which is affixed to the center of the bottom surface of the cap visor 12 in front to back disposition so that a guide path in the form of a channel 22 is formed lengthwise along the center of the holder 20. Rails 21 are formed along both sides of the guide path 22 in parallel relationship thereto. Adjacent each rail 21 there are formed a line of equally spaced upper holding teeth 23.

A carrier 30 has a trolley 31 with a rectangular notch 33 that is formed in the center of one side of a base 32 of the trolley 31. On the bottom surface of the trolley base 32, inwardly of the rectangular notch 33, there is formed a lower ledge 34. On both sides of the lower ledge 34 there are formed lower guide grooves 35. An upper ledge 36 is formed inwardly of the rectangular notch 33 on the top surface of the base 32. Upper guide grooves 37 are formed on both sides of the upper ledge 36. Guide flanges 38 are formed atop the trolley 31 in parallel spaced relationship to the base 32 for receiving, therebetween, the rails 21 of the holder 20. A hanger 41 has a vertical wall 42 extending downwardly from the underside of the trolley base 32 and, at its lowermost edge, turns upwardly in the form of an elbow 43.

Figure 4:
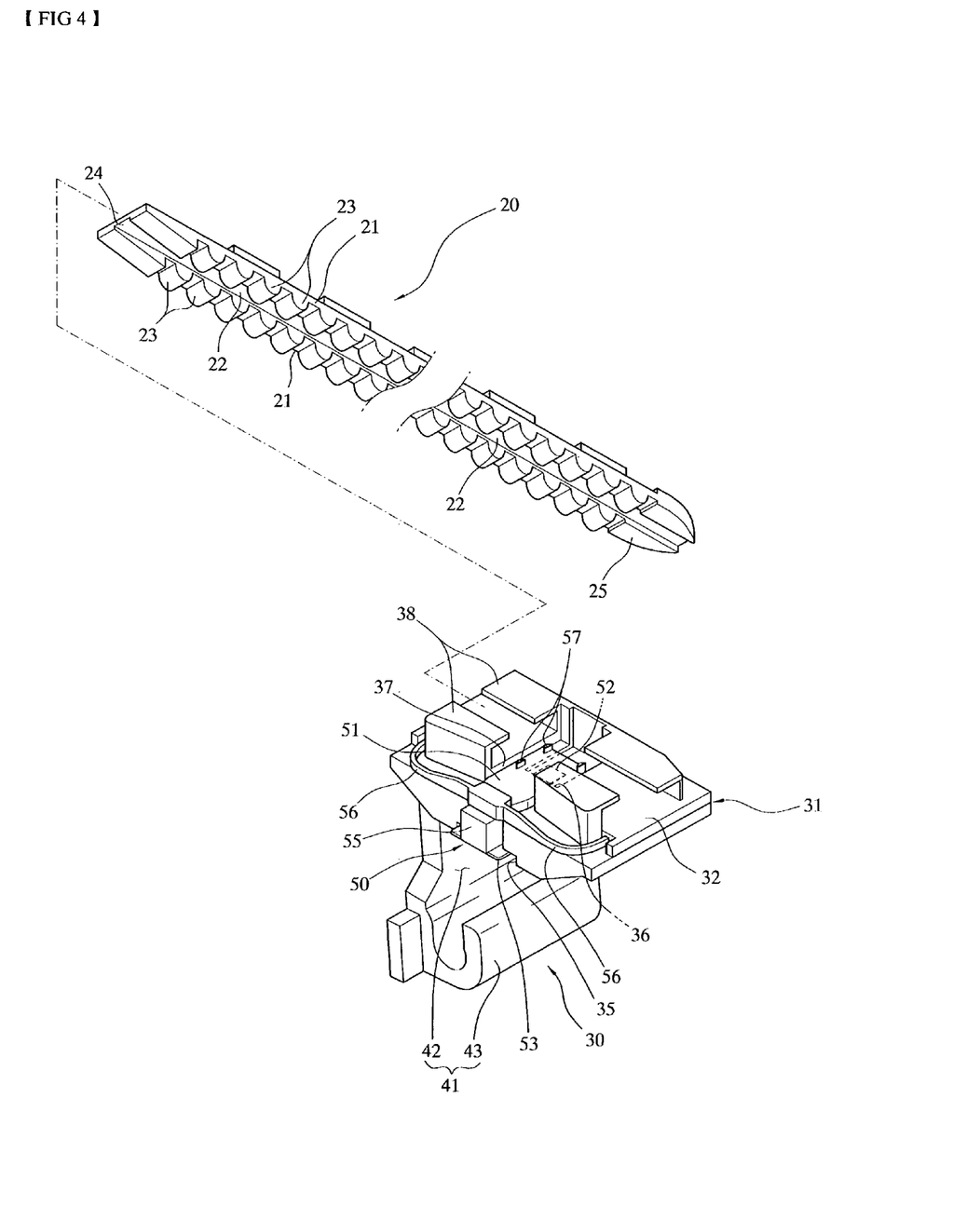
FIG. 4 is a partially exploded perspective view of the preferred embodiment of the invention shown in FIG. 1 in a fourth disposition.

A U-shaped latching assembly 50 has a base 55 which is dimensioned to be snugly received within the rectangular notch 33 of the trolley base 32. Inward turning spring arms 56 extend from opposite sides of the latching assembly base 55. As the base 55 is inserted into the notch 33 the ends of the spring arms 56 engage a shoulder in the base plate 32 as best seen in FIG. 4. As insertion of the base 55 continues against an opposing force exerted by the spring arms 56, parallel upper and lower tongues 51 and 53 are respectively guided along upper guide grooves 37 and lower guide grooves 35 on the trolley portion 31 of the carrier 30. Each of the tongues 51, 53 has a barbed edge 52, 54 for being selectively captured on respective upper ledge 36 and lower ledge 34 as the latching assembly 50 is snapped into place on the carrier 30 to form an integral body therewith.

Tines 57 are formed on the upper surface of tongue 51 so as to be situated in respective spaces between adjacent teeth 23 of the holder 20, thereby preventing axial movement of the carrier 30 relative to the holder 20. When pressure is applied to the base 55 of the latching assembly 50 against the force of the spring arms 56, the latching assembly is moved slightly inwardly causing the tines 23 to move out of alignment with the teeth 23 of the holder 20, thereby permitting axial movement of the carrier 30 relative to the holder 20.

Extending from a front side of a mounting unit 60 is a projection 61 for being fixedly received in a slot 14 formed in sunglasses 13 for attaching the sunglasses to the mounting unit 60. Extending upwardly from the mounting unit 60 is a connector 62 in the form of a loop, which is adapted to be hung on the elbow 43 of the carrier 30.

Thus it will be appreciated that by moving the carrier 30 to an appropriate position while pressing the base 55 of the latching assembly 50 and then releasing the pressure, the position of the sunglasses 13 attached to the cap visor 12 can be easily adjusted. Once pressure is released, the upper holding teeth 23 of the holder 20 and the tines 57 of the latching assembly 50 are interlocked so that the locked condition is maintained in a firm manner. These features facilitate simple and rapid adjustment of the position of the sunglasses 13 and prevent unwanted movement of the sunglasses along the rails 21 of the holder 20 once the position of the sunglasses 13 has been fixed, even when a moderate external force is applied, whereby an optimum wearing condition can be maintained at all times.

Thus, according to the invention, a cap with adjustable sunglasses, includes a holder 20 which is fixed onto a visor 12 of a cap 11, a carrier 30 which is slidably mounted on the holder 20 for relative movement therealong, a latching assembly 50 which is mounted on carrier 30 to selectively enable its movement along the carrier 30, a mounting unit 60 which is detachably connectable to the carrier 30, and a pair of sunglasses 13 which are mounted on the carrier 30 via the mounting unit 60.

The holder 20 is fixed lengthwise, front to back, to the center of the bottom surface of a visor 12 of a cap 11 so that a centered guide path 22 is formed along its length. Rails 21 are formed on both sides of the guide path 22 along its length.

Multiple upper holding teeth 23 are arrayed in equal intervals between the guide path 22 and rails 21 so that tines 57 of latching assembly 50. On a frontal end of the holder 20 there is a tapered portion 24 for facilitating mounting of the carrier 30 on the holder 20. A terminator element 25 is provided at the opposite, rear end of holder 20.

A rectangular notch 33 is formed at the center of one side of the base 32 of trolley 31 of carrier 30. A lower ledge 34 is formed on the bottom surface of the trolley base 32 inwardly of the rectangular notch 33, and lower guide grooves 35 are formed on both sides of lower ledge 34.

An upper ledge 36 is formed on the top surface of trolley base 32 inwardly of the rectangular notch 33, and upper guide grooves 37 are formed on both sides of the upper ledge 36. Guide flanges 38 are mounted on and spaced from the base 32 of the trolley 31 for forming a channel in which the holder 20 is received for enabling the carrier to be guided along the rails on both sides of the holder 20.

The carrier 30 has a trolley 31 from which there downwardly extends a hanger 41. Hanger 41 of carrier 30 has a downwardly extending wall 42 leading from under the base 32 of trolley 31, and elbow 43 which is formed in a bent shape at the bottom of wall 42 to which the connector 62 of mounting unit 60 may be attached and detached.

The latching assembly 50 has a base 55, two parallel extending tongues 51 and 53, and spring arms 56. Barbs at the ends of the tongues 51, 53 are captured in the upper and lower ledges 36, 34 of the carrier 30. Spring arms 56 extend from both sides of base 55.

Figure 1:
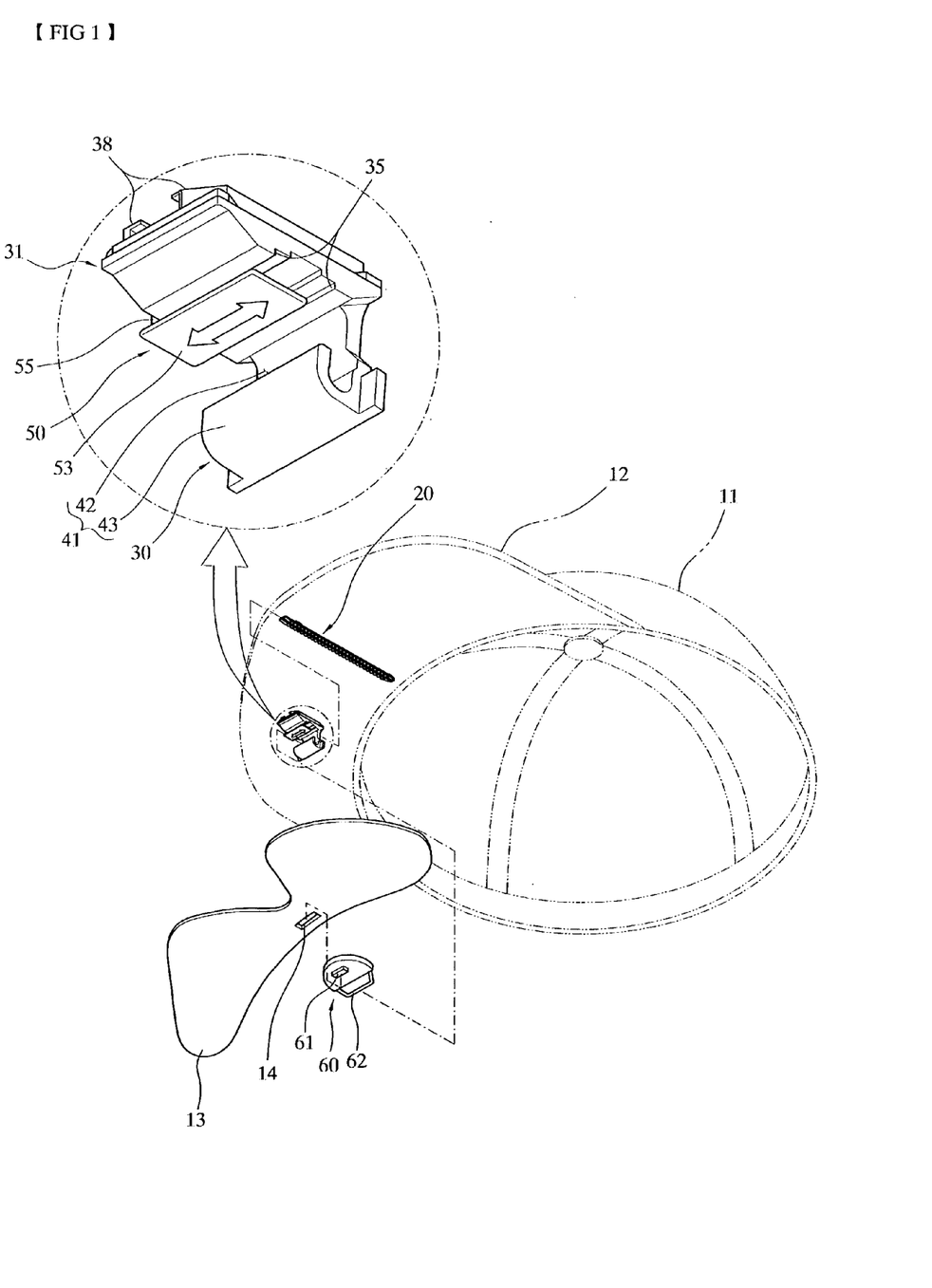
FIG. 1 is a partially exploded perspective view of a preferred embodiment of the invention in a first disposition.
Figure 2:
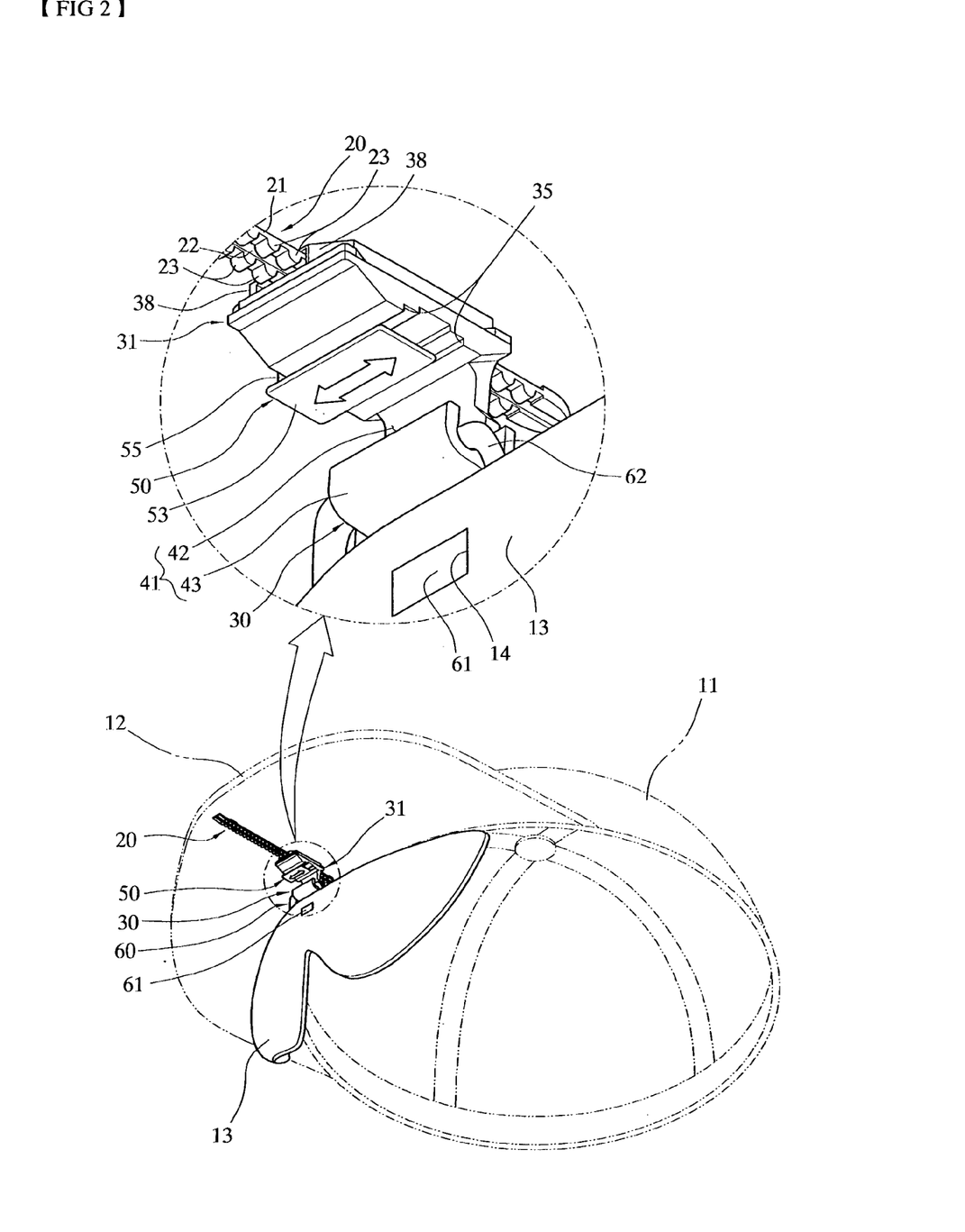
FIG. 2 is a partially exploded perspective view of the preferred embodiment of the invention shown in FIG. 1 in a second disposition.
Figure 3:
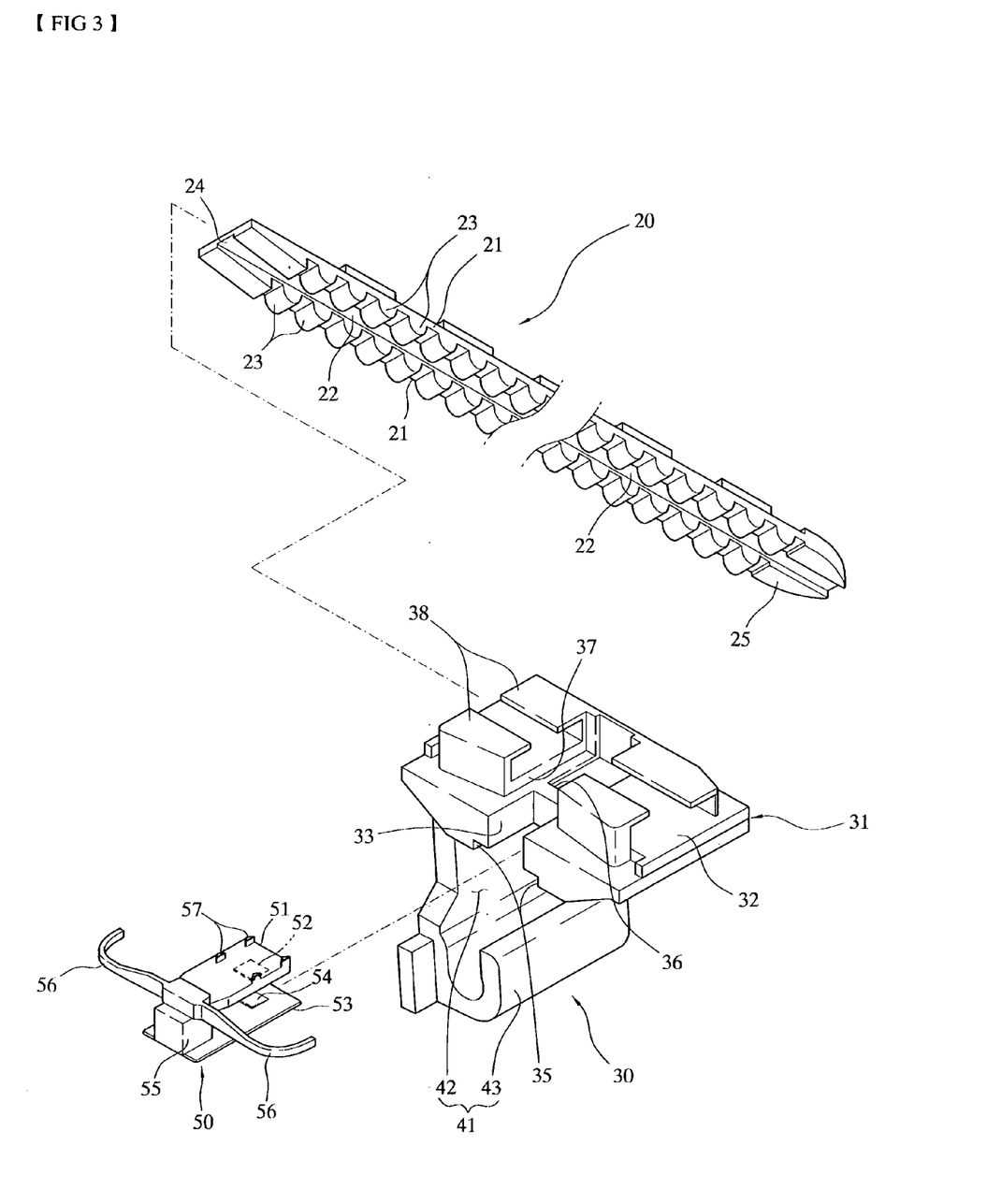
FIG. 3 is a partially exploded perspective view of the preferred embodiment of the invention shown in FIG. 1 in a third disposition.
Figure 5:
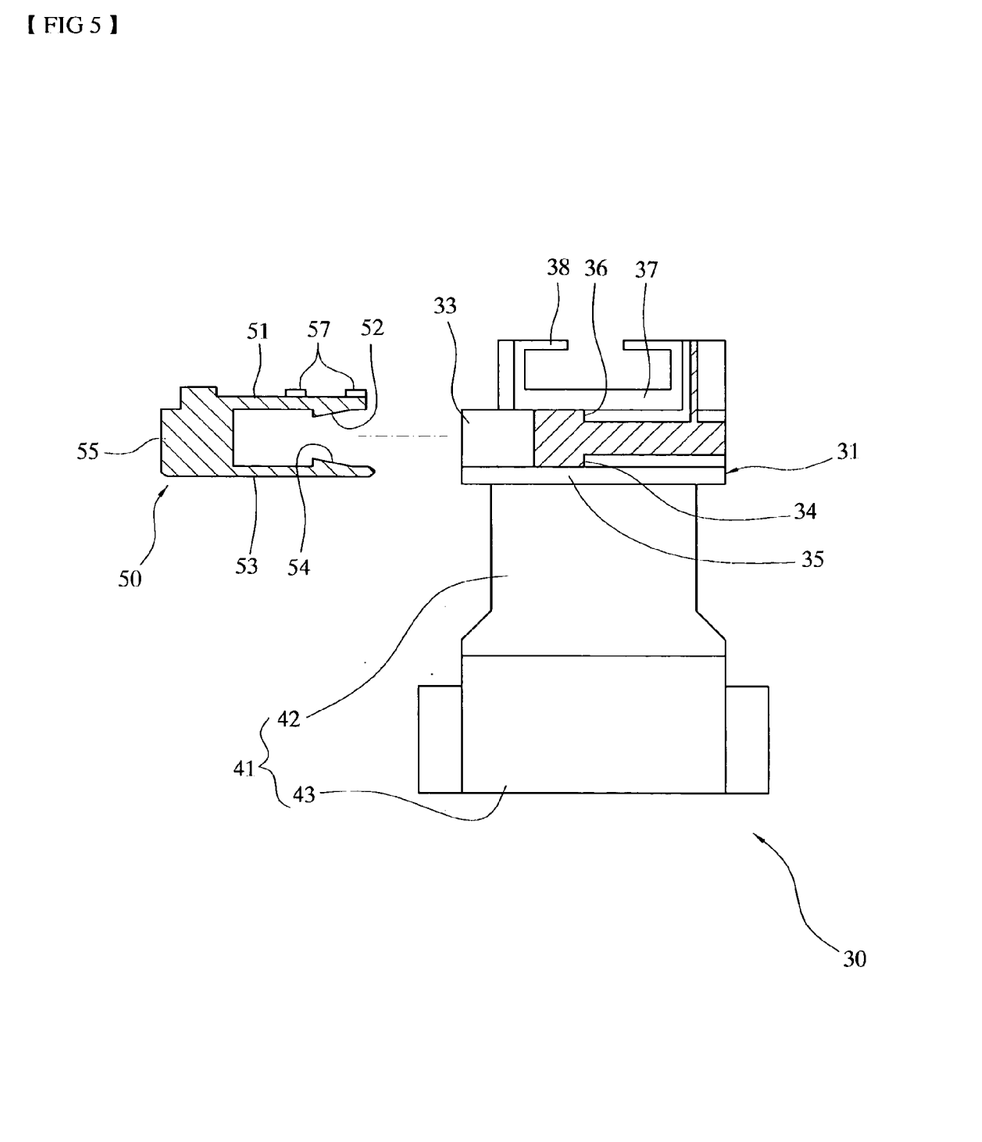
FIG. 5 is a sectional elevation view of a portion of the invention shown in FIG. 1 in one stage of assembly.

Assembly of the apparatus of the invention proceeds as follows. First, as shown in FIGS. 3 and 5, under the condition where carrier 30 and latching assembly 50 are separated, latching assembly 50 is inserted into carrier 30 with pressure to the disposition shown in FIGS. 4 and 6. Under this condition, where resilient flexible spring arms 56 of the latching assembly 50 are tensioned, i.e., urged outwardly, the upper barbed edge 52 of latching assembly 50 is captured by upper ledge 36 of carrier 30 and the lower barbed edge 54 of the latching assembly 50 is captured by lower ledge 34 of carrier 30.

When the carrier 30 is assembled with the latching assembly 50, it is then possible to press connector projection 61 into the lens slot 14 of sunglasses 13, and mount the connector 61 of mounting unit 60 onto the elbow 43 of carrier 30 to flexibly assemble them together.

Under this condition the carrier 30 is slid onto holder 20 while the latching assembly 50 is pressed, with the two guide flanges 38 of carrier 30 covering the two rails 21 of the holder 20.

When assembled properly as explained above, the present invention allows for adjustment of the distance between the wearer's face and the sunglasses 13 by pressuring and releasing the latching assembly 50 appropriately, whereafter any adjusted positions can be firmly maintained.

Figure 7:
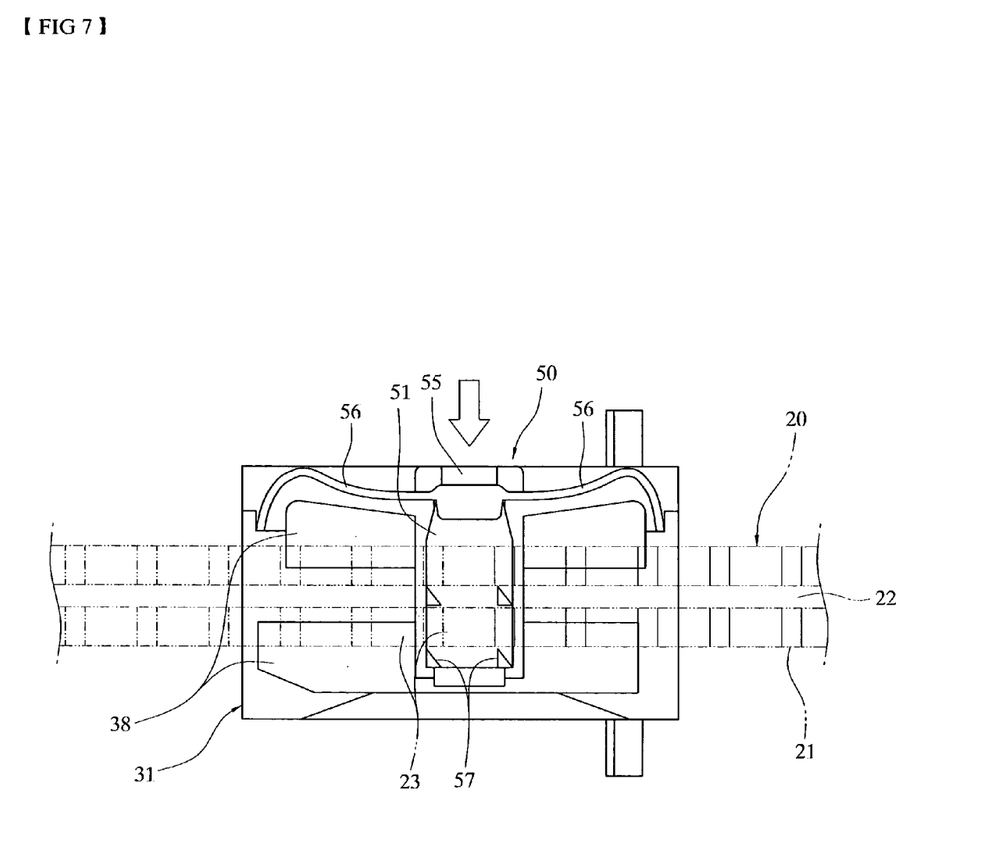
FIG. 7 is a plan view of the invention shown in FIG. 1 in another state.

As shown in FIG. 7, when the latching assembly 50 is pressed towards inside of carrier 30, the tines 57 of the latching assembly 50 are located to one side of guide path 22 and rails 21 of the holder 20 so that the tines 57 of latching assembly 50 are free from the upper holding teeth 23 of holder 20 to allow free movement of carrier 30 along the rails 21 of the holder 20.

Figure 6:
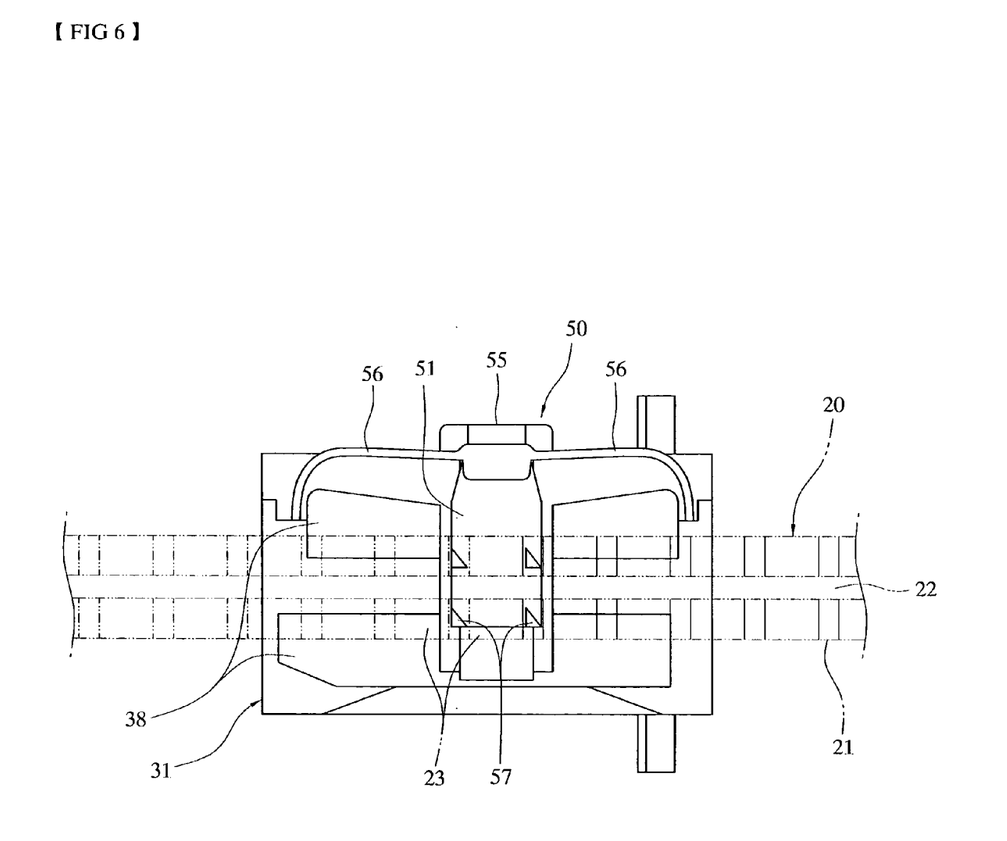
FIG. 6 is a plan view of the invention shown in FIG. 1 in one state.

If the pressure is released from the latching assembly 50, the spring arms 56 are restored to their normal positions, as shown in FIG. 6, so that the tines 57 of the latching assembly 50 are located in between upper holding teeth 23 of the holder 20, thus causing the tines 57 and the upper holding teeth 23 to be mutually locked, preventing movement of carrier 30 along the rails 21 of the holder 20.

Figure 8:
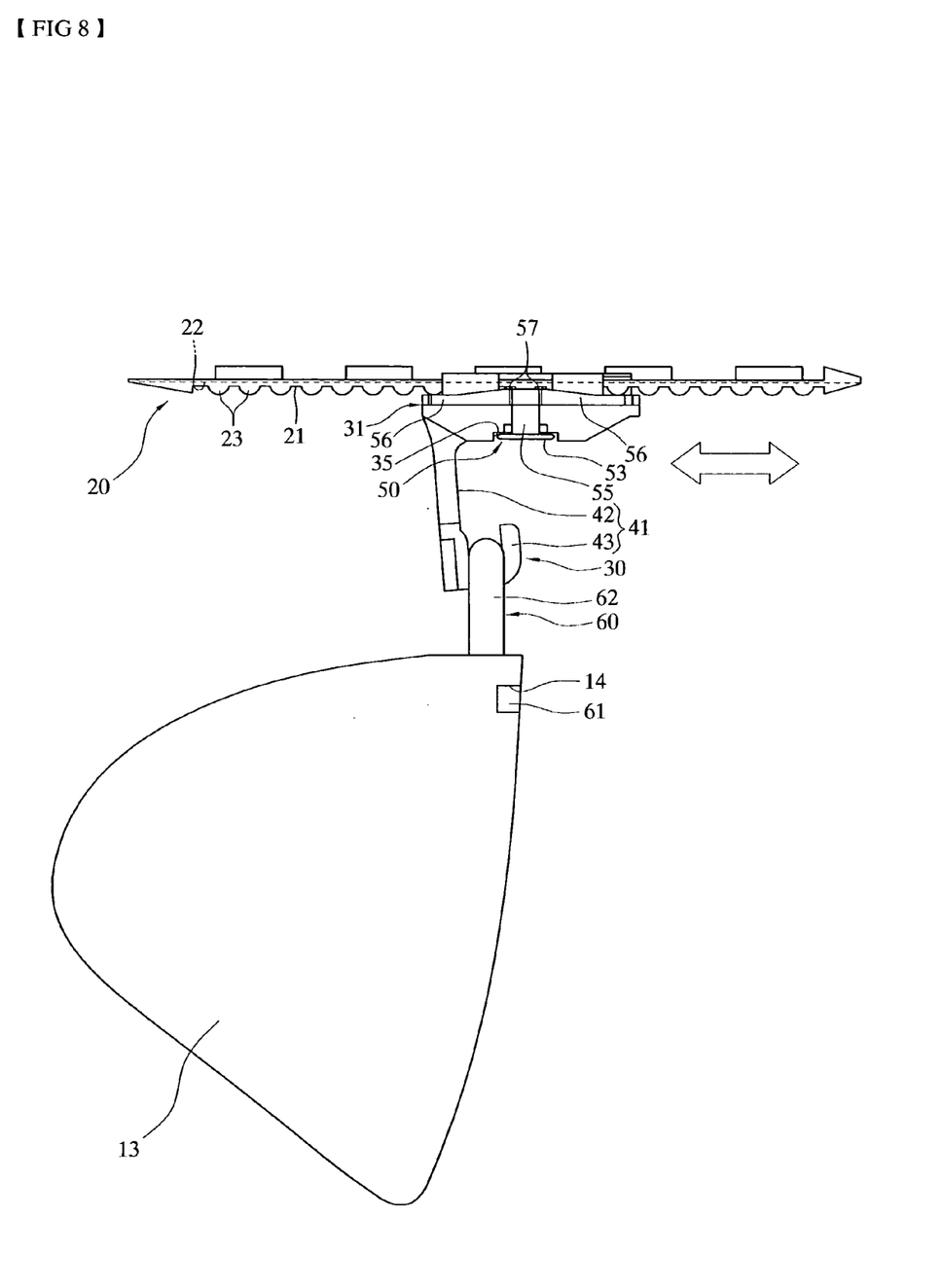
FIG. 8 is a partial side elevation view of the invention shown in FIG. 1.

The present invention allows for the latching assembly 50, when depressed as shown in Drawing 7, to permit sunglasses to be moved along the arrowed directions of FIG. 8 in a free manner. Upon release of the external pressure on the latching assembly 50, the carrier 30 is fixed at its location on the holder 20, thus firmly holding the sunglasses 13 in place.

Therefore, the position of the sunglasses 13 can be adjusted conveniently and rapidly, and the adjusted condition is maintained firmly through the simple steps of moving the carrier 30 to an appropriate location while pressing the latching assembly 50 and then releasing the pressure when the sunglasses have been positioned at a desirable location.

It is to be appreciated that the foregoing is a description of a preferred embodiment of the invention to which alterations and modifications may be made without departing from the spirit and scope of the invention.

What is claimed is:

1. Apparatus for mounting sunglasses on a cap comprising
    a holder mountable on a visor of a cap, said holder having first fastener means disposed along an axis,
    a carrier slidably mountable on said holder for linear movement along said axis, said carrier having second fastener means for engaging said first fastener means, latching means operatively mountable between said holder and said carrier, said carrier being adapted to be actuated between a normally locked state during which said second fastener means is in axial alignment with said first fastener means for preventing movement of said carrier along the length of said holder, and a released state during which said second fastener means is laterally displaced from the axis of said first fastener means for permitting movement of said carrier along the length of said holder, said latching means having a surface adapted to receive manual pressure for moving said latching means from said normally locked state to said released state, and resilient means for urging said latching means toward said normally locked state in the absence of manual pressure on said surface, and
    mounting means connectable to said sunglasses and to said carrier whereby said sunglasses may be selectively moved with said carrier along the length of said holder and then locked at a desired position with respect to said holder.

2. Apparatus according to claim 1 wherein said holder comprises spaced teeth and said latching means has at least one projection adapted to be selectively positioned between said teeth for locking said carrier with respect to said holder.

3. Apparatus according to claim 2 wherein said urging means comprises bias means operatively engageable with said second fastening means for urging said latching means to said locked state in the absence of external pressure, and for urging said latching means to said released state in the presence of external pressure.

4. Apparatus according to claim 3 wherein said urging means comprises a spring exerting a force in one direction, and said surface is adapted to be manually pressed for applying said external force in a direction opposite to the direction of force of said spring.

5. Apparatus according to claim 1 wherein said carrier comprises an elbow for hanging said mounting means to suspend said sunglasses in front of the eyes of a wearer of said cap.

6. Apparatus according to claim 5 wherein said mounting means comprises a loop adapted to be hung on said elbow.

7. Apparatus according to claim 6 wherein said mounting means comprises a projection adapted to be received within an aperture in said sunglasses.

8. Apparatus according to claim 1 wherein said carrier has a notch in which at least a portion of said latching means is slidably mounted.

9. Apparatus according to claim 1 wherein said carrier has a cover means at least partially circumscribing said holder.

10. Apparatus according to claim 1 wherein said latching means comprises a barb and said carrier has a ledge means for capturing said barb to prevent separation of said latch means from said carrier.

\* \* \* \* \*